US007229381B2

(12) United States Patent
Niessen et al.

(10) Patent No.: US 7,229,381 B2
(45) Date of Patent: Jun. 12, 2007

(54) METHOD FOR CONTROLLING ENGINE STARTS FOR A VEHICLE POWERTRAIN

(75) Inventors: Paul Niessen, Plymouth, MI (US); Carol Okubo, Belleville, MI (US); Paul Gartner, Dearborn, MI (US); Daniel Morris, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 11/160,019

(22) Filed: Jun. 6, 2005

(65) Prior Publication Data

US 2006/0276952 A1 Dec. 7, 2006

(51) Int. Cl.

| | |
|---|---|
| ***B60K 1/02*** | (2006.01) |
| ***F02P 5/00*** | (2006.01) |
| ***G06F 19/00*** | (2006.01) |
| ***G06G 7/70*** | (2006.01) |
| ***H02P 1/00*** | (2006.01) |

(52) U.S. Cl. ......................... 477/3; 477/7; 123/406.52; 123/406.53; 701/113

(58) Field of Classification Search .................... 477/3, 477/7; 123/406.52, 406.53, 339.11, 688; 701/101, 113
See application file for complete search history.

(56) References Cited

U.S. PATENT DOCUMENTS

| | | | |
|---|---|---|---|
| 4,021,677 A | 5/1977 | Rosen et al. | |
| 6,090,007 A | 7/2000 | Nakajima et al. | |
| 6,247,437 B1 | 6/2001 | Yamaguchi et al. | |
| 6,431,130 B1 | 8/2002 | Leone et al. | |
| 6,513,493 B1 | 2/2003 | Robichaux et al. | |
| 6,553,287 B1 | 4/2003 | Supina et al. | |
| 6,718,255 B1 | 4/2004 | Okubo | |
| 6,898,927 B2 * | 5/2005 | Morinaga et al. | 60/284 |
| 6,901,908 B2 * | 6/2005 | Miyamoto et al. | 123/339.11 |
| 6,926,639 B2 * | 8/2005 | Hopper | 477/110 |
| 6,966,299 B2 * | 11/2005 | Miyamoto et al. | 123/406.45 |

* cited by examiner

*Primary Examiner*—Tisha D. Lewis
(74) *Attorney, Agent, or Firm*—David B. Kelley; Brooks Kushman P.C.

(57) ABSTRACT

A method is disclosed for controlling an internal combustion engine in a vehicle powertrain. A filtered driver demand for torque at vehicle traction wheels is used to determine an engine torque command. The engine torque command is initialized to a percentage of a target engine torque as a function of variables that may include a smoothness factor.

14 Claims, 4 Drawing Sheets

METHOD FOR CONTROLLING ENGINE STARTS FOR A VEHICLE POWERTRAIN

BACKGROUND OF THE INVENTION

1. Field of the Invention

The invention comprises a control for an internal combustion engine in a vehicle powertrain wherein the response time for a driver demand for driving torque is reduced and engine start smoothness is improved.

2. Background Art

Hybrid electric vehicle powertrains of known design can be classified generally into three main categories commonly referred to as series hybrid powertrains, parallel hybrid powertrains and series-parallel hybrid powertrains. In each case, two power sources are available for powering a driven element connected driveably to vehicle traction wheels.

A series-hybrid powertrain comprises a fueled engine prime mover, which powers an electric or a hydraulic power transmission connected to a drive motor. The motor can be driven by a battery or by an engine driven generator. A parallel hybrid electric vehicle powertrain establishes parallel power flow paths from the engine through power transmission gearing as stored electrical energy drives the driven member through power transmission gearing. A so-called parallel-series hybrid electric vehicle powertrain combines a series-hybrid function and a parallel hybrid function. A parallel-series powertrain is disclosed in U.S. patent application Ser. No. 10/709,537, filed May 12, 2004, now U.S. Pat No. 7,013,213,and in U.S. patent application Ser. No. 10/905,324, filed Dec. 28, 2004. This patent and this patent application are assigned to the assignee of the present invention.

Parallel-series hybrid electric vehicle powertrains provide power flow paths to vehicle traction wheels through gearing. In one operating mode, a combination of an internal combustion engine and an electric motor-generator subsystem define in part separate torque delivery paths. The motor-generator subsystem includes a battery, which acts as an energy storing medium. In a first forward driving mode, the engine propels the vehicle using reaction torque of a generator, which is a part of the motor-generator subsystem. Planetary gearing makes it possible for the engine speed to be controlled independently of vehicle speed using generator speed control. In this configuration, engine power is divided between a mechanical power flow path and an electrical power flow path. The generator is electrically coupled to an electric motor of the motor-generator subsystem, which in turn drives the vehicle traction wheels. Because the engine speed is decoupled from the vehicle speed, the powertrain emulates the characteristics of a continuously variable transmission during a driving mode in which the engine is active.

The electric motor provides a braking torque to capture vehicle kinetic energy during braking, thus charging the battery as the motor acts as a generator. Further, the generator, using battery power, can drive against a one-way clutch on the engine power output shaft to propel the vehicle in a forward drive mode as the generator acts as a motor.

As in the case of conventional continuously variable transmissions in vehicle powertrains, it is possible to achieve better fuel economy and exhaust gas emission quality by operating the engine at or near the most efficient operating region of its engine speed and torque relationship. The engine can be stopped if the engine operating conditions are not favorable for high fuel efficiency operation or if the engine is not in a high emission quality operating region. In this way, the two power sources (i.e., the engine and the motor-generator subsystem) can be integrated and coordinated to work together seamlessly to achieve better fuel economy and emissions control.

A vehicle system controller performs the coordination of the control of the two power sources. Under normal powertrain conditions, the vehicle system controller interprets a driver demand for acceleration or deceleration torque and then determines when and how much torque each power source needs to provide in order to meet the driver's demand and achieve specified vehicle performance. Specifically, the vehicle system controller determines the speed and torque operating point for the engine.

The internal combustion engine, during an engine cranking mode during engine start ups, has an engine throttle position that is set to a fixed crank position. This position typically is very small (e.g., 1–2°) while the engine speed is increased up to the desired cranking speed and initial fuel injection takes place. Typically, the engine would include an electronic throttle with a controller that establishes an optimum fixed throttle angle during engine cranking, followed by an initial engine torque command position at the instant the engine running mode is initiated. At that instant, the control of the electronic throttle switches from a cranking software logic to a torque-based software logic for engine torque control. The throttle position effectively is fixed at a constant angle by the cranking logic, which ensures sufficient air flow through the engine throttle body to overcome engine frictional losses during initial engine combustion. Engine fuel injectors initiate fuel supply as combustion is started. Once combustion is established, control of the electronic throttle switches, from the cranking software logic to the engine torque control software logic. The cranking angle is independent of the target torque after the engine starts. Further, the initial engine torque command at the initiation of engine fueling is also independent of the target torque after the engine is running.

To achieve smooth engine starts at low power demand, the cranking throttle position should be relatively small, which results in a manifold pressure that is reduced to a low level during an engine start mode. If a high engine power is desired after the engine starts, the manifold pressure must be re-established and increased from the low engine cranking pressure value to a value consistent with the higher engine power that is desired. The re-establishment of manifold pressure delays the response time of the engine.

Merely adjusting the crank throttle position based on power demand or commanded torque would not be sufficient to improve response time since the commanded torque must be changed smoothly from an initial engine torque command to the desired, or targeted, engine torque command. If the initial torque command is too low (i.e., lower than the torque produced at the crank throttle angle), then the throttle position may initially close after the engine start. It then would be re-opened as the engine torque command increases to the target engine torque. Further, the smooth increase of the commanded engine torque from the initial engine torque to the desired engine torque may be too slow.

SUMMARY OF THE INVENTION

Although the invention may be applied to non-hybrid powertrains with internal combustion engines, a hybrid powertrain for an automotive vehicle is disclosed herein for the purpose of describing one possible embodiment of the invention.

The invention includes a method for reducing response time for a driver demand for engine torque. Provision may be made during advanced accelerator pedal engine starts for reducing the smoothness of the engine in favor of a faster initial response time. The invention provides an adder to a crank throttle position as a function of the engine power that will be requested after the engine start. The engine torque command is initialized after the engine start to a percentage of the desired engine torque rather than to a value that always begins at zero. The adder for the crank throttle position prevents the manifold pressure from being reduced to a very low value during and immediately following engine cranking. The initialization of the commanded engine torque at the start of an engine running mode will ensure that the commanded engine torque will result in a throttle position that is at least as large as a crank throttle position. This allows the throttle to open quickly after the engine starting mode is completed.

The adder value for the crank throttle position is a function of the desired engine power. This allows the engine to be cranked at a larger throttle position at higher power demands. A minimum throttle position is used on low power engine starts to ensure that the initial combustion results in smooth engine operation. The adder minimizes the decrease in the absolute manifold pressure during engine starts with an advanced accelerator pedal position.

Each engine start is assigned a so-called "smoothness factor" in which a factor of zero is an indicator of least smoothness, which corresponds to the fastest engine start. A smoothness factor of unity is an indicator of the smoothest start, which corresponds to the slowest engine start.

When the engine is running following the cranking mode, the engine torque command is filtered and initialized to a percentage of the target engine torque. That percentage is a function of the smoothness factor.

DETAILED DESCRIPTION OF AN EMBODIMENT OF THE INVENTION

The invention may be applied to an internal combustion engine controller in powertrains other than powertrains for hybrid electric vehicles, but the embodiment disclosed herein includes a hybrid electric vehicle powertrain with an internal combustion engine and an electric motor coupled to transmission gearing.

Figure 1:
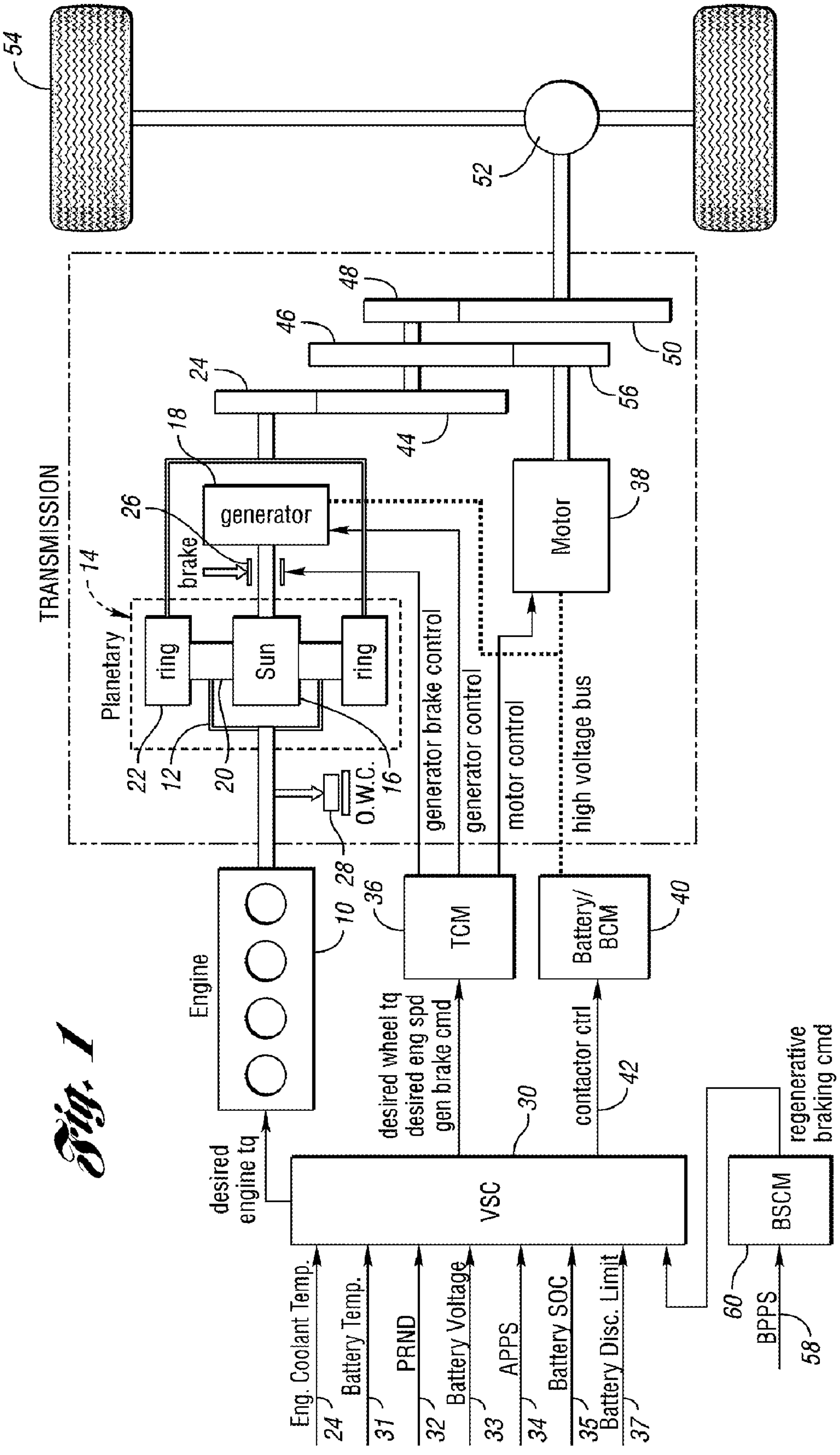
FIG. 1 is a schematic representation of a hybrid electric vehicle powertrain system capable of embodying the improvements of the invention.

In the hybrid powertrain configuration schematically illustrated in FIG. 1, a torque output crankshaft of internal combustion engine 10 is connected driveably to carrier 12 of planetary gear unit 14. Sun gear 16 of the gear unit 14, which acts as a reaction element, is driveably connected to generator 18. Carrier 12 rotatably supports planet pinions 20, which engage sun gear 16 and ring gear 22, the latter being connected driveably to transmission torque input gear 24. The generator 18 provides reaction torque when the engine delivers driving power to the transmission. The generator, which is part of a motor-generator-battery electrical subsystem, develops electrical power to complement mechanical engine power. A reaction brake 26 can be applied to establish a reaction point for the sun gear 16 and to deactivate the generator 18.

When the generator acts as a motor and the engine is deactivated, the crankshaft for the engine is braked by an overrunning coupling 28. Overrunning coupling 28 could be eliminated if sufficient reaction torque can be accommodated by the engine crankshaft when the engine is shut off.

The main controller for the powertrain is a vehicle system controller, generally shown at 30 in FIG. 1. It receives a driver-selected signal at 32, indicating whether the transmission is conditioned for park, reverse, neutral or drive mode. A battery temperature signal is distributed to controller 30 as shown at 31. An accelerator pedal position sensor, controlled by the vehicle driver, delivers a signal at 34 to the vehicle system controller 30. This is an indicator of power demanded by the driver. The controller 30 also receives an engine coolant temperature signal 29, a battery voltage signal 33, a battery state-of-charge signal 35, and a battery discharge limit signal 37.

The desired wheel torque command, the desired engine speed command and the generator brake command are developed by the vehicle system controller and distributed to the transmission control module 36 for controlling the transmission generator brake, the generator control and the motor control. Electric power is distributed to an electric motor 38, which may be a high voltage induction motor, although other electric motors could be used instead in carrying out the control functions of the invention.

The electrical power subsystem, of which the generator 18 and the motor 38 are a part, includes also battery and battery control module 40, which is under the control of the vehicle system controller 30, the latter developing a command at 42 for a battery control module contactor, which conditions the battery for charging or for power delivery. The battery, the motor and the generator are electrically connected by a high voltage bus as indicated.

The transmission includes countershaft gearing having gear elements 44, 46 and 48. Gear element 48 is connected to torque output gear 50, which delivers power to differential 52 and to traction wheels 54. The motor armature is connected to motor drive gear 56, which driveably engages gear element 46.

Application of the vehicle brakes develops a brake pedal position sensor signal 58, which is delivered to the brake system control module 60 for initiating a regenerative braking command by the vehicle system controller.

A hybrid vehicle powertrain, such as that illustrated in FIG. 1, makes use of a combination of the engine and generator using the planetary gear unit 14 to connect them to each other. In one driving mode, the electric drive system, including the motor, the generator and the battery, can be used independently of the engine. The battery then acts as an energy storing unit. When the engine is operative, the vehicle is propelled in a forward direction as reaction torque for the planetary gear unit is accommodated by the generator or by the reaction brake 26.

The planetary gear unit 14 effectively decouples the engine speed from the vehicle speed using a generator command from module 36. Engine power output then is divided into two power flow paths, one being a mechanical path from the carrier 12 to the ring gear 22 and finally to the transmission input gear 24. Simultaneously, an electrical power flow path is established from the carrier 12 to the sun gear 16 to the generator, which is coupled electrically to the motor. Motor torque drives output gear 56. This speed decoupling and the combined electrical and mechanical power flow paths make this transmission function with characteristics similar to a conventional continuously variable transmission.

When the electrical power flow path is effective with the engine inactive, the electric motor draws power from the battery and provides propulsion independently of the engine in both forward and reverse directions. Further, the electric motor can provide braking torque as the motor acts as a generator. This captures the vehicle kinetic energy during braking, which otherwise would be lost to heat, thereby charging the battery. The generator, furthermore, using battery power, can drive against one-way clutch 28 (or a reaction torque developed by the engine crankshaft) to propel the vehicle in a forward direction as the generator acts as a motor. Both the engine and the motor-generator-battery subsystem, as mentioned previously, can be used simultaneously to propel the vehicle in a forward direction to meet the driver's power demand and to achieve better acceleration performance.

As in the case of conventional continuously variable transmission vehicles, fuel economy and emission quality are improved by operating the engine in or near its most efficient region whenever possible. As previously explained, fuel economy potentially can be improved, as well as the emission quality, because the engine size can be reduced while maintaining the same vehicle performance due to the fact that there are two power sources. The engine can be stopped (turned off) and the motor can be used as the sole power source if the required engine operating conditions for the engine are not favorable for fuel economy and emissions quality purposes.

The engine 10 includes an engine controller 68, which controls engine fuel injectors, which respond to engine control parameters for delivering measured quantities of fuel to the engine cylinders. The control of air to the engine cylinders, as illustrated at 70, is effected by an electronic throttle control, as indicated at 72.

The engine controls respond to input variables, including manifold absolute pressure, as shown at 74, a mass air flow sensor signal, as shown at 76, an engine speed signal, as shown at 78, and an engine coolant temperature signal, as shown at 80.

In addition to electronic throttle control signals and fuel delivery signals developed by the engine control 68, a spark timing signal also is developed as shown at 82.

Assuming there are no subsystem component malfunctions, the vehicle system controller interprets driver demands, such as the drive range selection at 32 and acceleration or deceleration demand at 34, and then determines a wheel torque command based on the driver demand and the powertrain limits. In addition, the vehicle system controller determines how much torque each power source needs to provide, and when it needs it, in order to meet driver demand and to achieve a specified vehicle performance, a desired fuel economy and a desired emission quality level. The vehicle system controller thus determines when the engine needs to be turned off and on. It also determines the engine operating point (i.e., the engine speed and torque) for a given engine power demand when the engine is on.

Figure 2A:
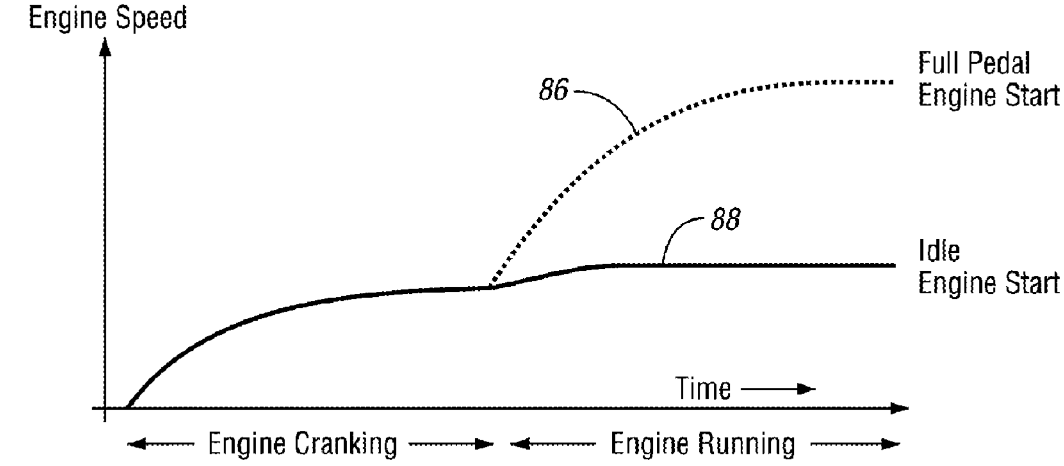
FIG. 2*a* is a time plot for engine speed during a full pedal engine start and an idle engine start during both an engine cranking mode and an engine running mode.
Figure 2B:
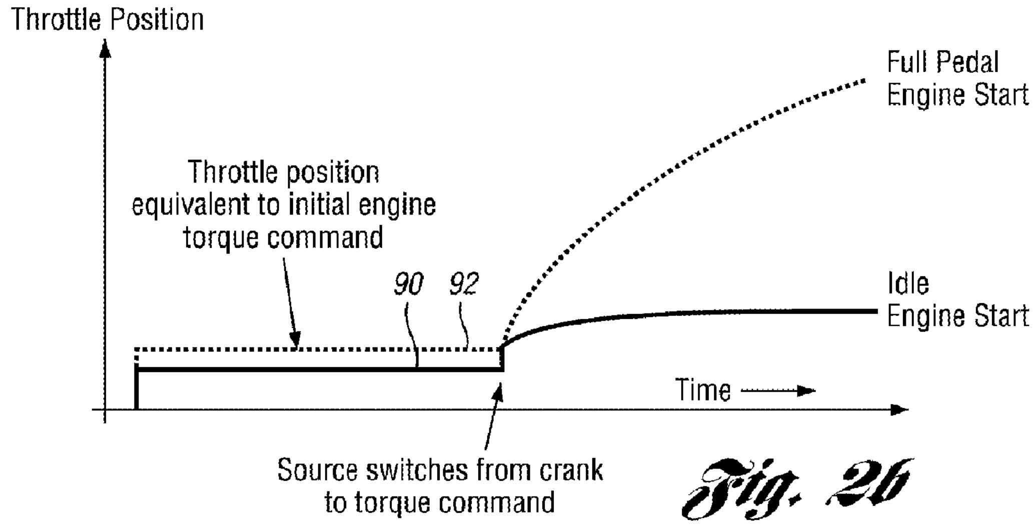
FIG. 2*b* is a time plot for throttle position during a full pedal engine start and an idle engine start.

FIG. 2*a* shows a comparison of the engine speed relationship with respect to time for a full pedal engine start and an idle engine start. This is indicated at 86 and 88, respectively. During the engine cranking mode, the throttle position may be set at a small angle, such as 2°, as indicated at 90 in FIG. 2*b*. During an engine idle mode, the initial engine torque command is very low and a throttle position equivalent to that low engine torque command is indicated by the value shown at 92. The throttle position remains unchanged during the cranking mode.

Figure 2C:
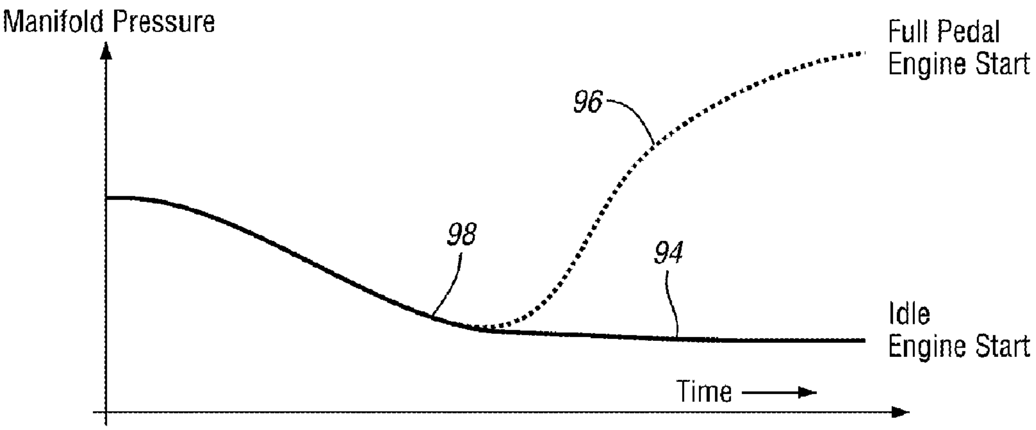
FIG. 2*c* is a time plot for manifold pressure for a full pedal engine start and an idle engine start.

The manifold pressure that exists during the engine cranking mode is plotted in FIG. 2*c* at 94 for an idle engine start and at 96 for a full accelerator pedal engine start. The manifold pressure decreases substantially, as represented by the dip at 98 in FIG. 2*c* in the manifold pressure plots.

If the driver desires high engine power immediately following the engine start, the manifold pressure must be increased rapidly from the low value shown at 98 in FIG. 2*c*. If the crank throttle position is increased to accommodate a high power demand, the larger crank throttle position would be similar to the position indicated at 100 in FIG. 3*a*. This is substantially higher than the throttle position equivalent to initial engine torque command for an idle engine speed start, as indicated at 102 in FIG. 3*a*, and higher than the normal crank throttle position, as shown at 104. The increase in the crank throttle position shown at 100, however, is not capable of resulting in a satisfactory response time since the commanded torque must be changed smoothly from the initial torque command at 106 to the desired engine torque indicated, for example, at 108 in FIG. 3*a*. If the initial torque command at 106 is significantly lower than the torque produced at the increased throttle position 100, the throttle position may initially close after the engine has started before it is opened by the control strategy to achieve the desired engine torque. This is the condition illustrated in FIG. 3*a*.

Figure 3A:
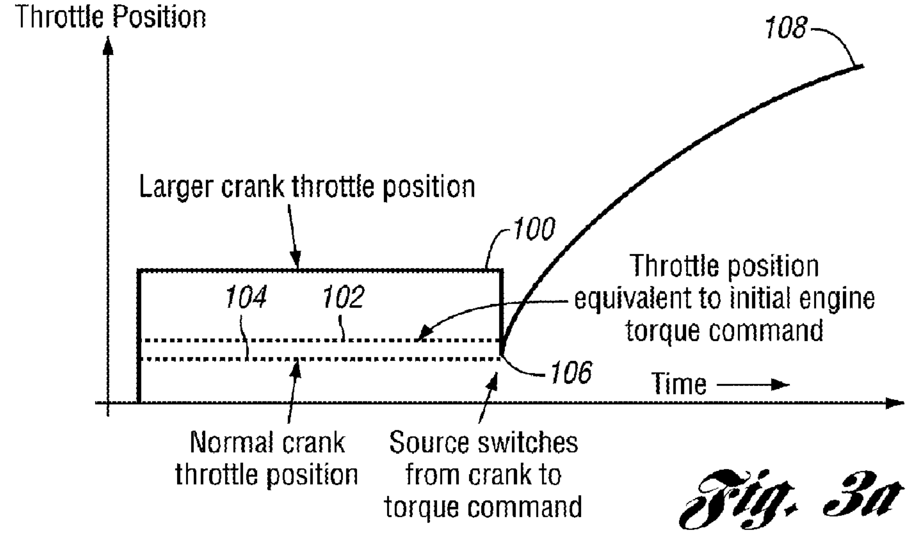
FIG. 3*a* is a time plot for a throttle position during engine cranking and engine running modes wherein the throttle position has been increased during cranking.
Figure 3B:
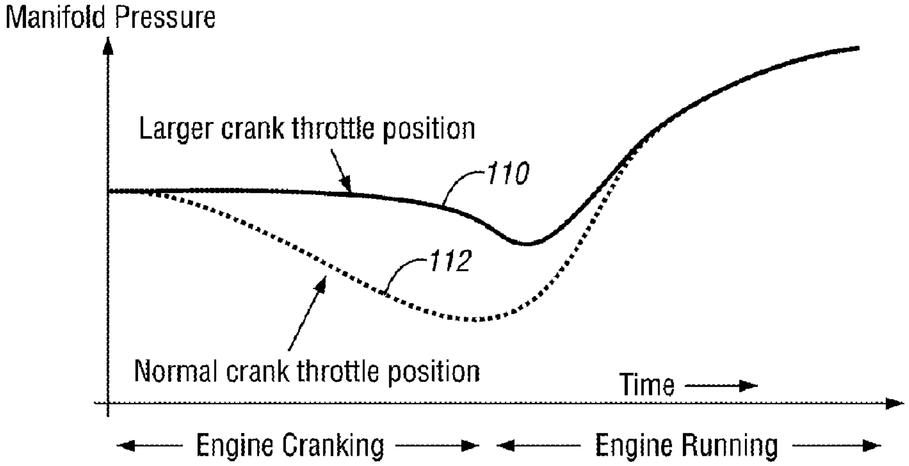
FIG. 3*b* is a time plot of manifold pressure during engine cranking and engine running, which is consistent with the throttle position data indicated in FIG. 3*a;*

The manifold pressure that corresponds to the throttle position time plot of FIG. 3*a* is shown in FIG. 3*b*. The larger crank throttle position, shown at 100 in FIG. 3*a*, will result in a relatively high manifold pressure due to the increased throttle angle, as indicated at 110 in FIG. 3*b*. The normal manifold pressure and crank throttle position plot shown in FIG. 2*c* is repeated in FIG. 3*b* at 112 for purposes of comparison with the plot shown at 110.

The control logic for the cranking mode that determines the crank throttle position at 100 in FIG. 3*a*, is distinct from the control logic that determines the throttle position during a torque-based command for engine torque. The controller must switch logic at point 106, shown in FIG. 3*a*, as a transition is made from cranking logic to torque-based command logic. It is this characteristic that results in inadequate response of the controller to an increase in the cranking throttle position.

Figure 4A:
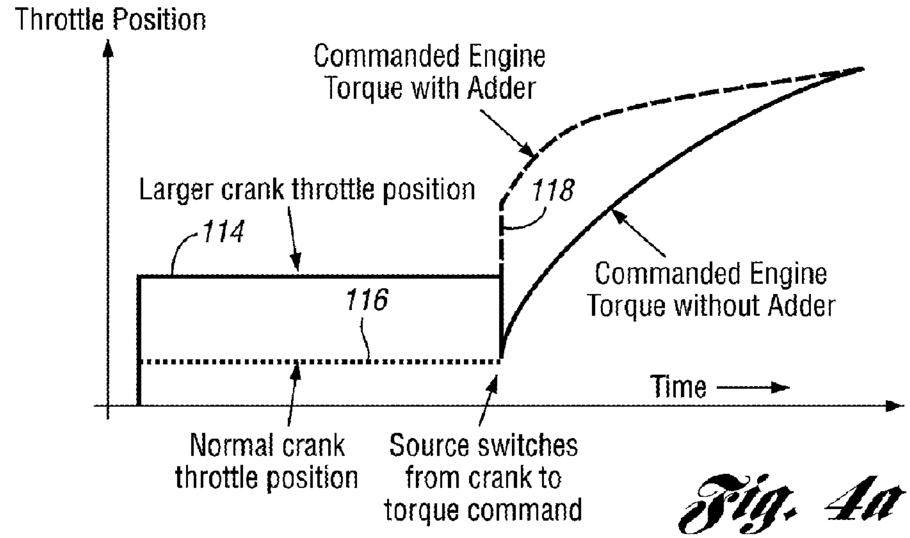
FIG. 4*a* is a time plot of throttle position for an engine controller that incorporates the features of the invention wherein the crank throttle position is increased without resulting in a reduction in throttle angle to a closed position at the beginning of the engine running mode.

FIG. 4*a* shows control strategy incorporating the improvements of the invention. As indicated, a larger crank throttle position is used, as shown at 114, during the cranking mode. The normal crank throttle position, shown at 116, corresponds to the normal crank throttle position shown at 104 in FIG. 3*a*.

The torque command throttle position logic of FIG. 4*a* does not require a return of the throttle position to a minimal value before the throttle again is reopened. This is due to the fact that the strategy of the present invention involves using a throttle position adder value, as shown at 118, during the engine cranking mode as the controller switches from the crank mode logic to the torque command mode logic. This prevents the manifold pressure from decreasing significantly, as indicated in the time plot for manifold pressure shown in FIG. 4*b*. The manifold pressure plot using the improved controlled strategy of the invention results in a manifold pressure/time relationship, as shown at 120 in FIG. 4*b*.

Figure 5:
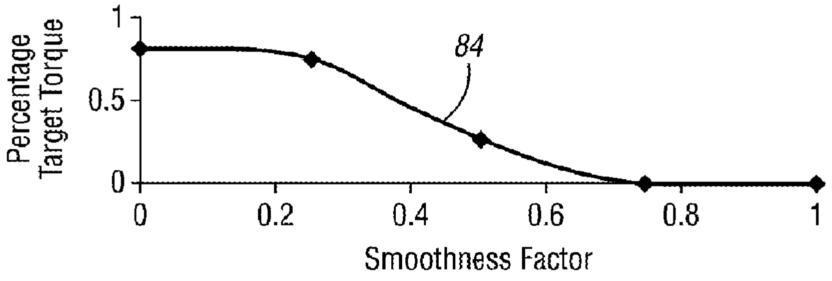
FIG. 5 is a plot illustrating the relationship of smoothness factor to percentage of target torque.

FIG. 5 is a plot of the percentage of target engine torque as a function of the so-called smoothness factor. The smoothness factor is used in a control routine as a measure of how smooth an engine start should be. A smoothness factor of unity is an indicator of most engine smoothness. A smoothness factor of zero is an indicator of least engine smoothness. Using this smoothness factor, the action taken by the engine and the transmission controls will regulate smoothness. The system is calibrated to meet driver requirements by determining a smoothness factor that can be adjusted for different vehicles while using the same subsystem elements. For a complete description of the steps used in the computation of the smoothness factor, reference may be made to U.S. patent application Ser. No. 10/709,537, by M. Quang et al., filed on May 12, 2004, entitled “Method for Controlling Starting of an Engine in a Hybrid Electric Vehicle Powertrain,” which is assigned to the assignee of the present invention. The calibration method disclosed in that application is incorporated herein by reference.

In FIG. 5, the percentage of target engine torque varies as a function of smoothness factor, as indicated at 84. The variation of percentage target torque with changing smoothness factor values is a calibrated value that need not assume the particular profile shown in FIG. 5.

Figure 4B:
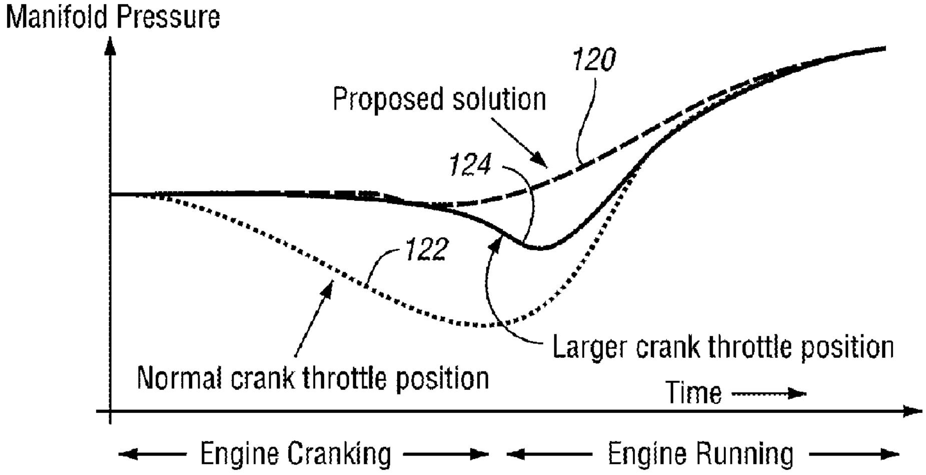
FIG. 4*b* is a time plot of manifold pressure for an engine that incorporates the throttle position strategy of FIG. 4*a;*

FIG. 4*b* shows a plot, for comparison purposes, of a typical or normal reduction in manifold pressure for a normal crank throttle position described with reference to FIG. 2*c*. This is indicated at 122. The improvement in the manifold pressure due to the use of a larger crank throttle position, described with reference to FIG. 3*a*, is indicated in FIG. 4*b* at 124. In contrast to the plot shown at 122 and 124, the plot at 120 shows the improved control strategy of the invention wherein the reduction, if any, of the manifold pressure is a minimum at the end of the engine cranking mode. The desired engine torque at that instant is initialized to ensure that the commanded engine torque will result in a throttle position that is at least as large as the crank throttle position. It allows the throttle to open quickly after the engine start mode is completed.

The crank throttle position typically is scheduled as a function of barometric pressure and engine coolant temperature. The opening of the throttle is designed to ensure sufficient air flow for the engine to accommodate engine frictional losses. The adder to the crank throttle position, shown at 118 in FIG. 4*a*, is a function of the desired engine torque. This allows the engine to be cranked at a larger throttle angle when the power demand is high. With a larger throttle position, the initial engine combustion event results in less smooth operation than at the minimum throttle position, however the larger crank throttle position minimizes the dip in the manifold pressure, as shown at 110 in FIG. 3*b*.

Figure 6:
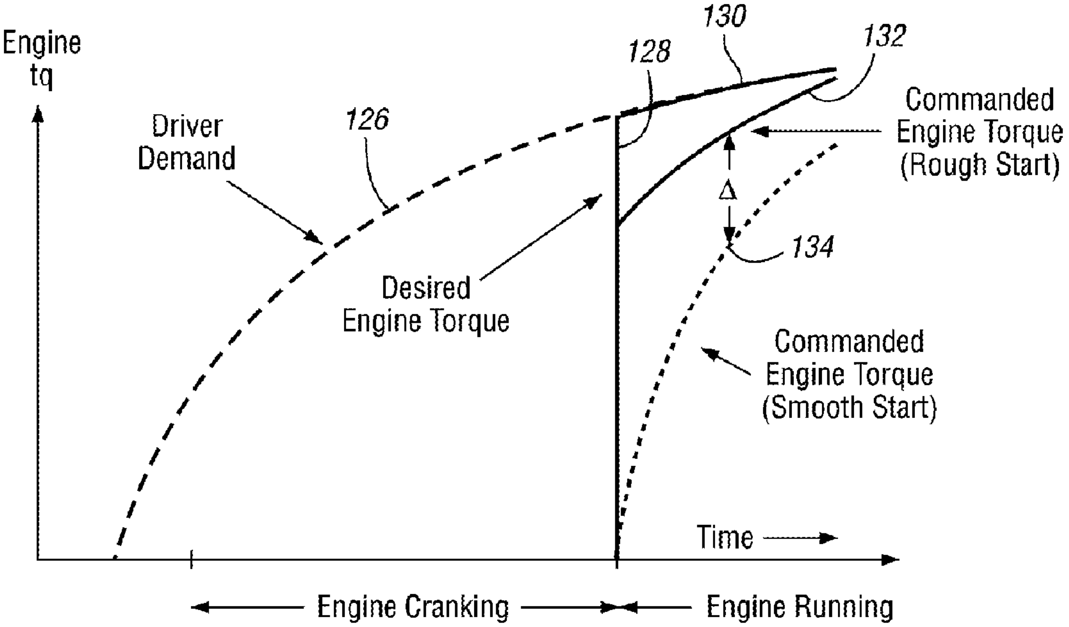
FIG. 6 is a time plot for engine torque for both a commanded engine torque for rough starts and a commanded engine torque for smooth starts.

As indicated previously, a fast engine start would correspond to a reduced smoothness factor. FIG. 6 is a plot that illustrates a fast engine start with an advanced throttle setting. A driver demand for engine torque is indicated in FIG. 6 at 126. The shape of the curve depends on a time trace of the accelerator pedal position, which is a driver input.

The desired engine torque for a fast engine start is shown in FIG. 6 at 128 and 130. The desired engine torque is filtered with a first order filter to produce the commanded engine torque, as shown at 132 and 134, with the engine running. The filtering eliminates transient fluctuations in the magnitude of the desired engine torque value.

During a fast engine start, the filtered commanded engine torque time plot is shown at 132. For purposes of comparison, the filtered commanded engine torque time plot for a smooth start is indicated at 134. The separation at any given time between the commanded engine torque plot at 134 and the commanded engine torque plot at 132 is indicated by the symbol Δ. An engine start may be assigned a fast start with a low smoothness factor when either there is an immediate need for engine power with a full accelerator pedal setting, or because the battery has limited power capacity, or because the engine friction is high due to low ambient air or engine coolant temperatures. The initial value of Δ is determined by the smoothness factor as a percentage of the target engine torque as shown in FIG. 5.

Although an embodiment of the invention has been described, it will be apparent to persons skilled in the art that modifications may be made without departing from the scope of the invention. All such modifications and equivalents thereof are intended to be covered by the following claims.

What is claimed is:

1. A method for controlling starting of an internal combustion engine in a powertrain for an automotive vehicle, the engine having an air intake manifold controlled by an engine throttle, the method comprising the steps of:

scheduling an engine cranking throttle position to accommodate a manifold air intake flow required for a low power demand during an engine cranking mode;

scheduling a time-based advanced throttle position as a function of torque command during an engine running mode; and increasing a throttle opening during the engine cranking mode by adding to the engine cranking throttle position an adder value as a function of commanded engine power during the engine running mode, whereby a delay in a response to the driver demand for engine power is reduced.

2. A method for controlling starting of an internal combustion engine in a powertrain for an automotive vehicle, the engine having an air intake manifold controlled by an engine throttle, the method comprising the steps of:

scheduling an engine cranking throttle position to accommodate a manifold air intake flow required for a low power demand during an engine cranking mode;

scheduling a time-based advanced throttle position as a function of commanded engine torque during an engine running mode; and increasing the engine cranking throttle position whereby air intake manifold pressure during the engine cranking mode is increased.

3. A method for controlling starting of an internal combustion engine in a powertrain for an automotive vehicle, the engine having an air intake controlled by an engine throttle, the method comprising the steps of:

scheduling an engine cranking throttle position to accommodate a manifold air intake flow required for a low power demand during an engine cranking mode;

scheduling a time-based advanced throttle position as a function of commanded engine torque during an engine running mode; and increasing the engine cranking throttle position further in advance of the engine running mode by adding to the engine cranking throttle position an adder value as a function of engine power requested by the driver during the engine running mode.

4. The method set forth in claim 1 wherein the engine cranking throttle position is scheduled as a function of operating variables including barometric pressure and engine coolant temperature.

5. The method set forth in claim 2 wherein the engine cranking throttle position is scheduled as a function of operating variables including barometric pressure and engine coolant temperature.

6. The method set forth in claim 3 wherein the engine cranking throttle position is scheduled as a function of operating variables including barometric pressure and engine coolant temperature.

7. The method set forth in claim 2 wherein the air intake manifold pressure during operation of the engine near the beginning of the engine running mode is increased, whereby a response time for achieving a commanded torque is reduced.

8. The method set forth in claim 3 wherein the air intake manifold pressure during operation of the engine near the beginning of the engine running mode is increased, whereby a response time for a achieving commanded torque is reduced.

9. The method set forth in claim 1 including the step of filtering a driver demand for torque to produce the commanded engine torque;

computing a smoothness factor for each engine start by arbitrating given operating variables, including engine temperature and driver demand for power; and initializing the torque command to a percentage of a target value of the torque command, the percentage being a function of the smoothness factor.

10. A method for controlling a hybrid electric vehicle powertrain comprising a throttle-controlled internal combustion engine, at least one electric traction motor-generator, a battery and transmission gearing establishing plural power delivery paths from the engine and the motor-generator to vehicle traction wheels, the engine having an air intake manifold controlled by an engine throttle, the method comprising the steps of:

scheduling an engine cranking throttle position to accommodate a manifold air intake flow required for a low power demand during an engine cranking mode;

scheduling a time-based advanced throttle position as a function of torque command during an engine running mode; and increasing a throttle opening during the engine cranking mode by adding to the engine cranking throttle position an adder value as a function of commanded engine power during the engine running mode, whereby a delay in a response to the driver demand for engine power is reduced.

11. A method for controlling a hybrid electric vehicle powertrain comprising a throttle-controlled internal combustion engine, at least one electric traction motor-generator, a battery and transmission gearing establishing plural power delivery paths from the engine and the motor-generator to vehicle traction wheels, the engine having an air intake manifold controlled by an engine throttle, the method comprising the steps of:

scheduling an engine cranking throttle position to accommodate a manifold air intake flow required for a low power demand during an engine cranking mode;

scheduling a time-based advanced throttle position as a function of commanded engine torque during an engine running mode; and increasing the engine cranking throttle position during the engine cranking mode whereby air intake manifold pressure during the engine cranking mode is increased.

12. The method set forth in claim 11 wherein the engine cranking throttle position is scheduled as a function of operating variables including barometric pressure and engine coolant temperature.

13. The method set forth in claim 12 wherein the air intake manifold pressure during operation of the engine near the beginning of the engine running mode is increased, whereby a response time for a achieving commanded torque is reduced.

14. The method set forth in claim 13 including the step of filtering a driver demand for torque to produce a commanded engine torque;

computing a smoothness factor for each engine start by arbitrating given operating conditions, including engine temperature and driver demand for power; and initializing the engine torque command to a percentage of a target value of the engine torque command, the percentage being a function of the smoothness factor.

* * * * *